United States Patent [19]

Kane et al.

[11] Patent Number: 5,072,765
[45] Date of Patent: Dec. 17, 1991

[54] AUXILIARY TIRE BEAD DEPRESSOR

[75] Inventors: John P. Kane; Francis H. Goodman, both of Sterling Heights, Mich.

[73] Assignee: American Hofmann Corporation, Lynchburg, Va.

[21] Appl. No.: 605,547

[22] Filed: Oct. 30, 1990

[51] Int. Cl.$^5$ .............................. B60G 25/06
[52] U.S. Cl. ........................ 157/1.1; 157/1.2
[58] Field of Search .............. 157/1, 1.1, 1.17, 1.2

[56] References Cited

U.S. PATENT DOCUMENTS

| | | | |
|---|---|---|---|
| 2,874,760 | 2/1959 | Bishop | 157/1.1 |
| 3,552,469 | 1/1971 | Corless | 157/1.1 |
| 3,669,175 | 6/1972 | Sorenson et al. | 157/1.1 |
| 3,866,654 | 2/1975 | Duquesne | 157/1.1 |
| 3,978,903 | 9/1976 | Mueller et al. | 157/1.2 |
| 4,183,392 | 1/1980 | Kane | 157/1.1 |
| 4,355,674 | 10/1982 | Grasso | 157/1.2 |
| 4,735,250 | 4/1988 | Kane | 157/1.1 |
| 4,850,402 | 7/1989 | Cunningham et al. | 141/38 |

Primary Examiner—James G. Smith
Attorney, Agent, or Firm—Basile and Hanlon

[57] ABSTRACT

An auxiliary tire bead depressor is provided for use with an apparatus for inflating a tubeless tire having sidewalls and upper and lower annular tire beads. The tire is mounted on a wheel having upper and lower wheel flanges against which the upper and lower tire beads seal, respectively. The apparatus has an inflation head and an annular tire seal ring extending outwardly therefrom for depressing the tire sidewall. The auxiliary tire bead depressor comprises a mechanism, spaced from the annular tire seal ring, for selectively depressing the upper tire bead away from the upper wheel flange. The tire bead depressing mechanism is moved from an advanced position wherein the depressing mechanism engages and depresses the tire, to a retracted position wherein the depressing mechanism is spaced from the tire. The auxiliary tire bead depressor is mounted to the inflation head.

12 Claims, 3 Drawing Sheets

AUXILIARY TIRE BEAD DEPRESSOR

BACKGROUND OF THE INVENTION

1. Field of the Invention

The present invention relates generally to an auxiliary tire bead depressor, and more particularly, to such a depressor which may selectively depress a tire's upper bead from an upper wheel flange.

2. Description of the Relevant Art

High production tire inflator apparatuses for rapidly inflating tubeless tires wherein sealing between the tires and the wheels occurs at the tire beads are well known. One such typical apparatus is shown and described in U.S. Pat. No. 4,735,250, which is incorporated herein by reference. Most tire inflation machines have an inflation head which depends from a carriage attached to a plurality of rods. The inflation head includes an annular tire seal ring affixed to the lower ends of the rods. A compressed air supply fitting communicates with the seal ring for injecting air within the ring and into the tire. The inflation head of most known machines is designed to have a lower edge of large enough diameter to pass over the largest rim of a wheel to be accommodated by the apparatus. The problem inherent in these machines is that when the machine is used with smaller diameter rims, the lower edge of the inflation head engages the tire at a relatively large spaced distance from the wheel rim. This greatly decreases the volume of the tire, which leads to premature tire bead sealing during inflation and causes lower than specified final inflation pressure in the tire, which is normally 4½ to 5 bar, or 65 to 75 psi. This problem could be alleviated if the plant air supply could be raised to a high enough pressure. However, plant air supply is normally limited to approximately 6 bar, or 90 psi. In order to raise the plant air supply past this limit, the entire facility would have to be repiped.

Thus, it would be desirable to provide an apparatus which would prevent premature tire bead sealing on smaller diameter tires, yet at the same time would not interfere with the inflation of larger diameter tires. It would also be desirable to provide such an apparatus which could be utilized with already existing inflation apparatus, i.e., an apparatus which can cause an increase in tire inflation pressure while keeping within the limits of the normal plant air supply.

SUMMARY OF THE INVENTION

The present invention solves the problems enumerated above by providing an auxiliary tire bead depressor for use with an apparatus for inflating a tubeless tire having sidewalls and upper and lower annular tire beads. The tire is mounted on a wheel having upper and lower wheel flanges against which the upper and lower tire beads seal, respectively. The apparatus has an inflation head and an annular tire seal ring extending outwardly therefrom for depressing the sidewall. The auxiliary tire bead depressor comprises means, spaced from the annular tire seal ring, for selectively depressing the upper tire bead away from the upper wheel flange. Means are provided for moving the tire bead depressing means from an advanced position wherein the depressing means engages and depresses the tire when the inflation head is in an advanced position, to a retracted position where the depressing means is spaced from the tire. The auxiliary tire bead depressor further comprises means for mounting the tire bead depressor to the inflation head.

BRIEF DESCRIPTION OF THE DRAWINGS

Other objects and features of the invention will become apparent by reference to the following specification and to the drawings, in which.

DESCRIPTION OF THE PREFERRED EMBODIMENT

Figure 1:
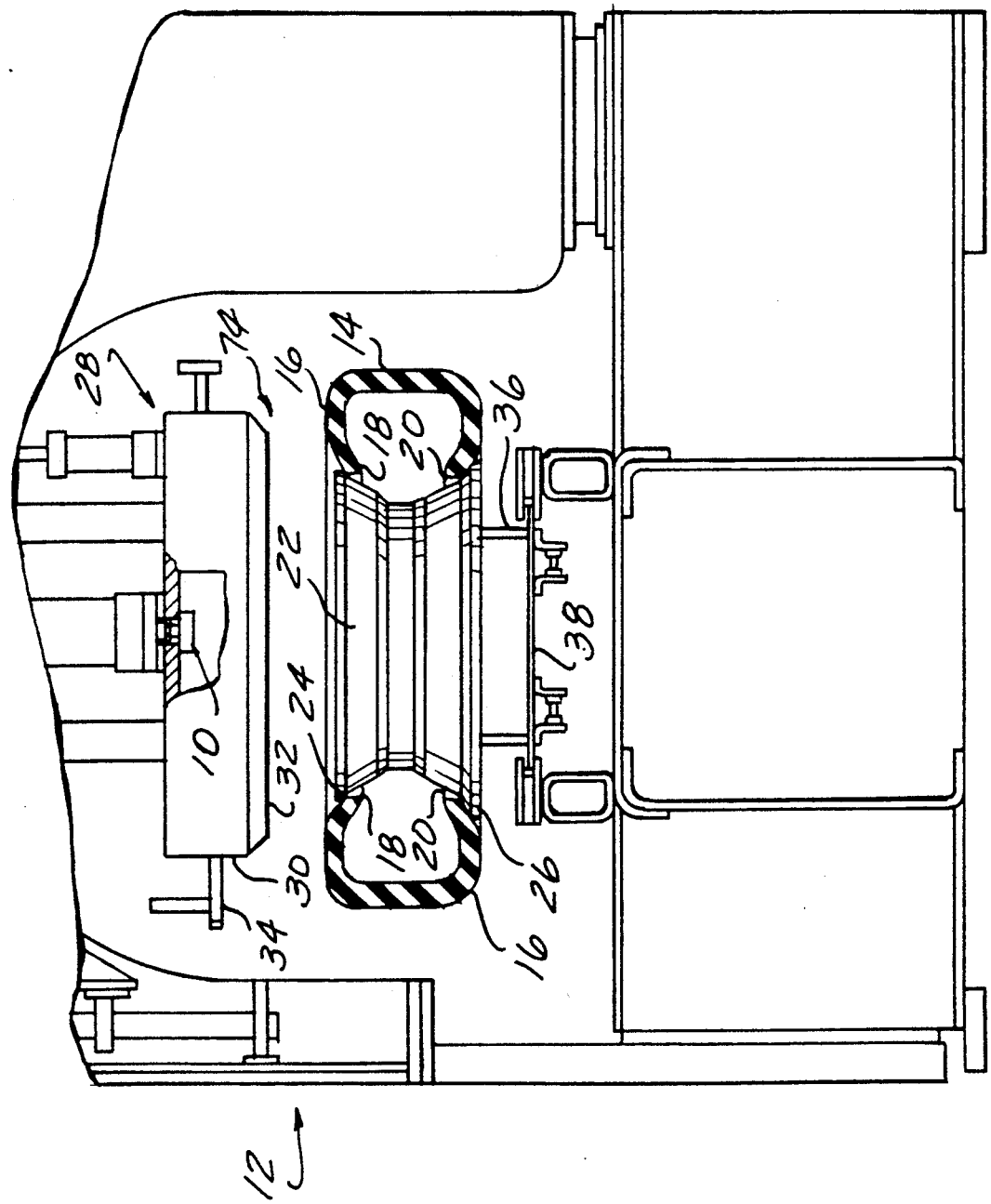
FIG. 1 is an elevational cut-away view, partially sectioned, of a typical tire inflation apparatus having an auxiliary tire bead depressor mounted thereon, the inflation head being shown in the retracted position.

Referring now to FIG. 1, the auxiliary tire bead depressor of the present invention is designated generally as 10. A typical apparatus for inflating tubeless tires is designated generally as 12. A tubeless tire 14 has sidewalls 16 and upper and lower annular tire beads 18, 20, respectively. Tire 14 is mounted on a wheel 22 having upper and lower wheel flanges 24, 26, respectively, against which the upper and lower tire beads 18, 20 seal, respectively. The apparatus 12 has an inflation head designated generally as 28 and an annular tire seal ring 30 extending outwardly therefrom for depressing tire sidewall 16. The outwardly and downwardly extending tire seal ring 30 terminates in an obliquely disposed lip having a lower edge 32. The diameter of the lip edge 32 is greater than the diameter of the rim of a wheel to be accommodated by the apparatus. A compressed air supply fitting 34 communicates with seal ring 30 for injecting air within the ring below the upper surface of the ring 30. Wheel supporting pallets 36 include a circular support plate 38 having a periphery the diameter of which is greater than the diameter of the wheel 22 mounted upon pallet 36. The remaining features and mechanisms of the inflation apparatus 12 may be any which are conventionally and suitably used in the art, and/or any referred to in U.S. Pat. No. 4,735,250.

Figure 4:
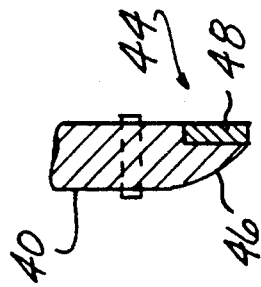
FIG. 4 is an enlarged, detail cross-sectional view of the projection taken on line 4—4 of FIG. 5.
Figure 5:
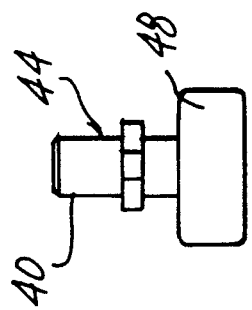
FIG. 5 is an enlarged front view of the projection with the rectangular shaped pad.
Figure 8:
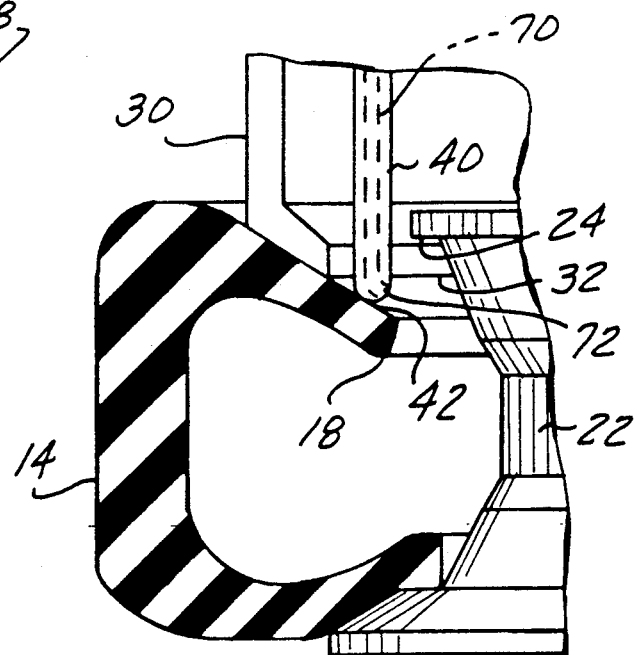
FIG. 8 is an enlarged detail cut-away view of FIG. 2 showing the contact of the annular tire seal ring and the shaft with the tire sidewall, and showing the optional bore within the shaft.

Auxiliary tire bead depressor 10 comprises means, spaced from the annular tire seal ring 30, for selectively depressing upper tire bead 18 away from upper wheel flange 24. The tire depressing means may comprise any suitable means and may be located in any position such that it contacts the tire sidewall and causes the tire bead to be depressed from the wheel flange. In the preferred embodiment, this tire bead depressing means is located radially inward from the tire seal ring 30, as best seen in FIG. 8. In the preferred embodiment, this tire bead depressing means may comprise a shaft 40. The shaft 40 may have an arcuate shaped tip 42 which contacts tire 14. Shaft 40 may further have a projection 44 as best seen in FIGS. 4 and 5. This projection 44 has two sides, with an arcuate shaped surface 46 on one side and a rectangular shaped pad 48 on the other side. Projection 44 is at an end of shaft 40 which contacts tire 14.

Figure 2:
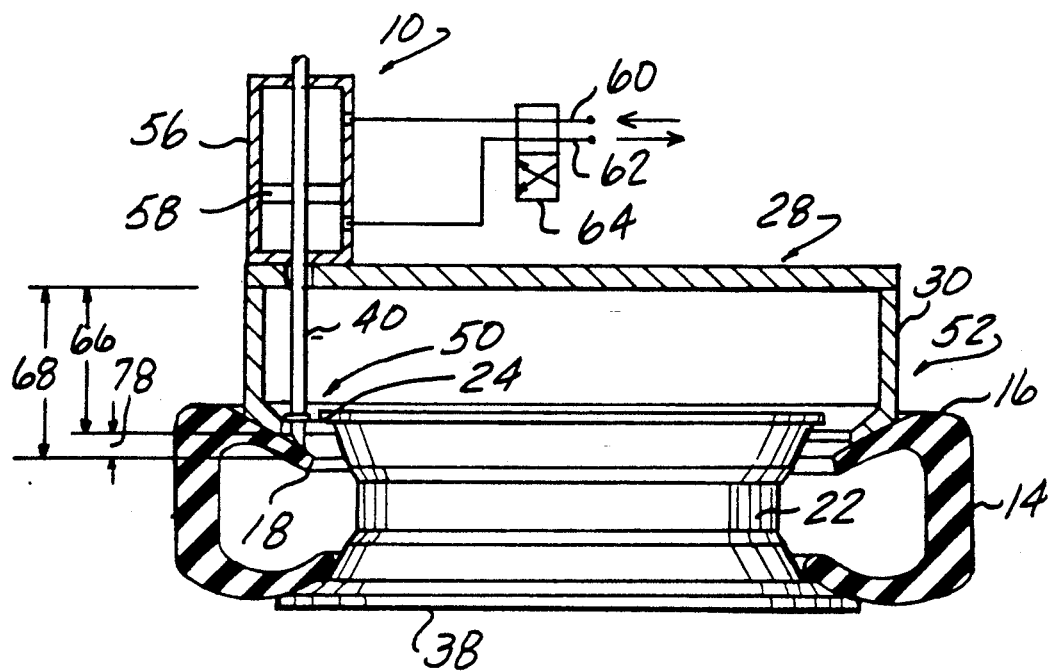
FIG. 2 is a cross-sectional view taken along line 2—2 of FIG. 7, illustrating the relationship of the inflation head, tire and auxiliary tire bead depressor in the fully advanced position wherein both the inflation head and the tire bead depressor are advanced.
Figure 6:
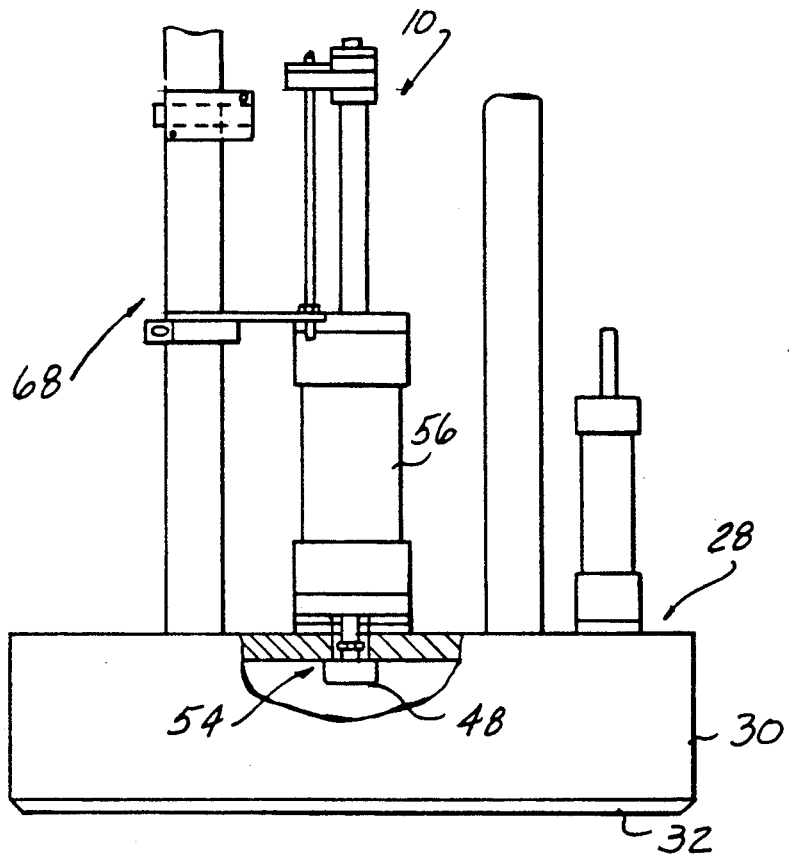
FIG. 6 is an enlarged detail view, partially cut-away and partially sectioned showing the auxiliary tire bead depressor mounted on the inflation head.
Figure 7:
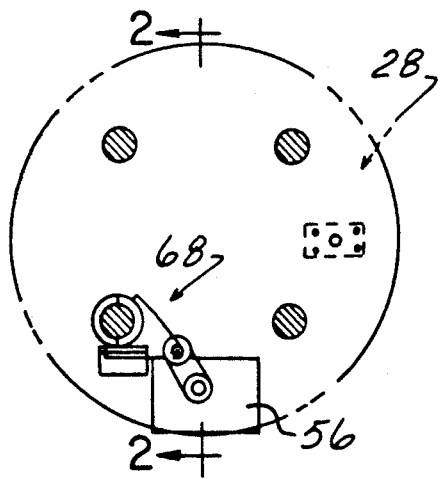
FIG. 7 is a top view of the view shown in FIG. 6.

Auxiliary tire bead depressor 10 further comprises means for moving the tire bead depressing means from an advanced position 50 wherein the depressing means engages and depresses tire 14 as best seen in FIG. 2, to a retracted position 54, as best seen in FIG. 6, wherein the depressing means is spaced from tire 14. The tire bead depressing means is moved independently of the inflation head. However, the inflation head 28 should preferably be in an advanced position 52 or 76 at the same time as the tire bead depressor means in order that the tire bead depressor means more easily contacts the tire sidewall 16. The moving means may comprise any suitable or conventionally known means, such as hydraulic means, electrical means, a solenoid or a fluid pressure operated cylinder. The moving means could also be a mechanical means, such as a worm gear or the like. In the preferred embodiment, the moving means comprises an air cylinder 56 having a piston 58 reciprocably movable therein, as best seen in FIG. 2. Compressed air is supplied at pipe 60 and exhausted at pipe 62. Sliding block valve 64, or any other suitable valve means, controls the flow of air through operation of a solenoid (not shown), or any other suitable controlling means. Within air cylinder 56, shaft 40 is attached to, and extends outwardly from piston 58.

Referring now to FIG. 2, annular tire seal ring 30 extends a first distance 66 from inflation head 28 and depresses tire bead 18 from upper wheel flange 24. The tire bead depressing means extends a second distance 68 from inflation head 28, with second distance 68 being greater than first distance 66.

The auxiliary tire bead depressor 10 further comprises means 68 for mounting the tire bead depressor 10 to inflation head 28. As seen in FIG. 6, mounting means 68 secures air cylinder 56 to inflation head 28. Mounting means 68 may comprise any suitable means which will securely fasten the tire bead depressor 10 to inflation head 28, such as brackets, nuts and bolts, or any other mounting means conventionally known in the art.

Referring now to FIG. 8, auxiliary tire bead depressor 10 may optionally comprise a bore 70 through shaft 40, with bore 70 having an opening adjacent tip end 42. The upper end of bore 70 is connected to pressurized air which would be directed through the bore and out through the opening 72 for directing additional air precisely at the gap between the tire bead 18 and wheel flange 24 caused by the tire bead depressing means.

Auxiliary tire bead depressor 10 described in detail above is advantageous for many reasons which would be apparent to those ordinarily skilled in the art, a few of which are the following. The tire bead depressor is of a relatively simple design, and may be selectively activated depending upon the diameter of the particular tire being inflated. The invention will prevent the entire tire bead from sealing prematurely by deforming the tire bead with the tire bead depressing means. Without being bound to any theory, it is believed that the resultant decrease in the area further increases the air pressure within the tire. It is also contemplated that a plurality of tire bead depressors may be used in connection with a tire inflation apparatus in order to achieve the end result herein disclosed, or any other results.

A method for inflating a tubeless tire using the apparatus of the present invention comprises the steps of:

1. Determining that the diameter of the wheel is such that the auxiliary tire bead depressor 10 needs to be activated. In the preferred embodiment, it would be efficient and expedient if this were the first step, however, it is to be understood that this step, as well as those that follow, may appear in any suitable order which will achieve the desired end result.

2. Moving inflation head 28 to a fully advanced position 52, with annular tire seal ring 30 extending a first distance 66 from inflation head 28, wherein tire seal ring 30 depresses tire sidewall 16.

3. Moving the tire bead depressing means to the advanced position 50, with the tire bead depressing means extending a second distance 68 from the inflation head, wherein second distance 68 is greater than first distance 66.

4. Turning on an air supply means, such as at the compressed air supply fitting 34. It is preferred that the tire bead depressing means be in place and deforming the tire bead before the air supply means is turned on. Otherwise, once the air begins to inflate the tire and seals the bead against the wheel flange, it may be difficult for the tire bead depressing means to depress the tire bead.

5. Allowing the pressurized air from the air supply means to inflate tire 14 to a predetermined inflation pressure.

6. Turning off the air supply means.

7. Raising the tire bead depressing means to the retracted position 54.

8. Raising the inflation head 28 to the retracted position 74.

Figure 3:
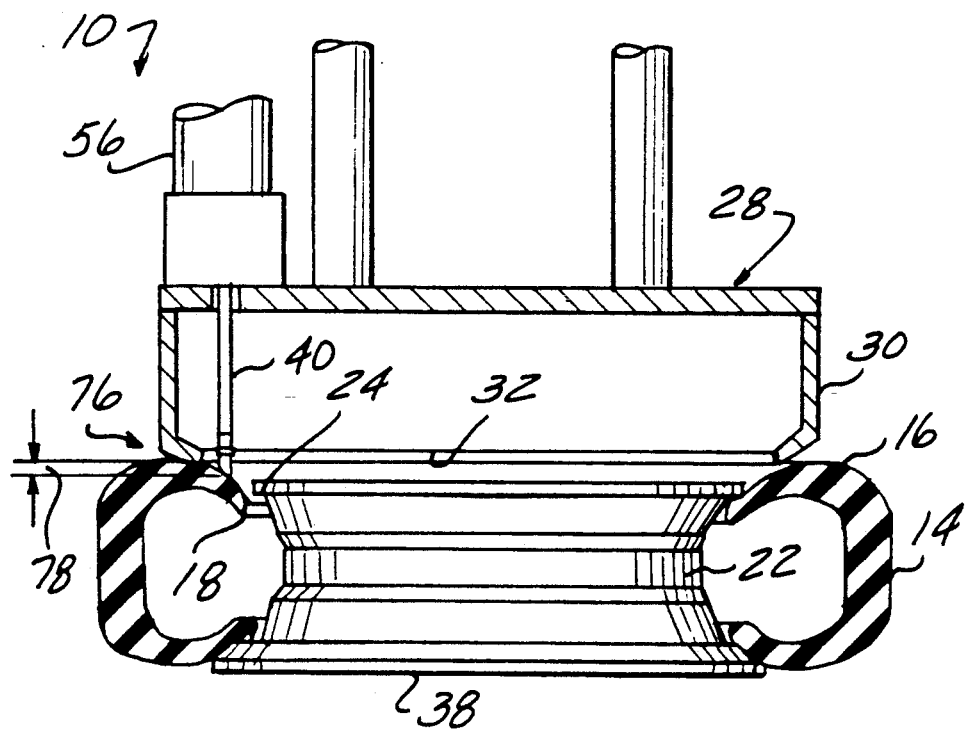
FIG. 3 is a detail, enlarged, elevational view, partially sectioned, illustrating the relationship of the inflation head, tire and auxiliary tire bead depressor in the intermediate position.

The method, before the inflation head 28 and the tire bead depressing means are retracted fully, may further comprise the steps of:

1. Retracting inflation head 28 to an intermediate position 76 as shown in FIG. 3, while keeping the relative positions of the annular tire seal ring 30 and the tire bead depressing means in a fixed relationship, such that tire bead 18 is in close proximity to, but spaced from upper wheel flange 24. Due to this fixed relationship, the distance 78 between the lower edge 32 of annular tire seal ring 30 and the tip 42 of shaft 40 remains constant as the apparatus moves from the advanced position shown in FIG. 2 to the intermediate position shown in FIG. 3 wherein lower edge 32 is raised to be slightly above the upper rim of wheel 22.

2. After the apparatus has been raised to intermediate position 76, this position is held for an amount of time sufficient to complete inflation of tire 14 to the predetermined inflation pressure.

While preferred embodiments of the invention have been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. An apparatus for inflating a tubeless tire, the tubeless tire having sidewalls and upper and lower annular tire beads, the tire being mounted on a wheel having upper and lower wheel flanges against which the upper and lower tire beads seal, respectively, the apparatus comprising:

an inflation bead having means for selectively supplying pressurized air to the tire;

an annular tire seal ring extending outwardly therefrom for depressing the sidewall; and an auxiliary tire bead depressor, said auxilliary tire bead depressor comprising:

a) means, spaced from the annular tire seal ring, for selectively depressing the upper tire bead away from the upper wheel flange;

b) means for moving said upper tire bead depressing means from an advanced position wherein said depressing means engages and depresses the upper tire bead to a retracted position wherein said depressing means is spaced from the tire; and c) means for mounting said auxiliary tire bead depressor to said inflation head.

2. The auxiliary tire bead depressor as defined in claim 1 wherein said tire bead depressing means comprises a shaft.

3. The auxiliary tire bead depressor as defined in claim 2 wherein said shaft has an arcuate shaped tip which contacts the tire.

4. The auxiliary tire bead depressor as defined in claim 2 wherein said shaft has a projection having two sides, said projection having an arcuate shaped surface on one side and a rectangular shaped pad on the other side, said projection being at an end of said shaft which contacts the tire.

5. The auxiliary tire bead depressor as defined in claim 1 wherein said tire bead depressing means is located radially inward from the tire seal ring.

6. The auxiliary tire bead depressor as defined in claim 1 wherein said moving means comprises a fluid-pressure operated cylinder having a piston reciprocably movable therein.

7. The auxiliary tire bead depressor as defined in claim 6 wherein said tire bead depressing means comprises a shaft attached to, and extending outwardly from said piston.

8. The auxiliary tire bead depressor as defined in claim 1 wherein said annular tire seal ring extends a first distance from said inflation head and depresses the tire bead from said upper wheel flange, and the tire bead depressing means extends a second distance from said inflation head, with the second distance being greater than said first distance.

9. An auxiliary tire bead depressor for use with an apparatus for inflating a tubeless tire having sidewalls and upper and lower annular tire beads, the tire being mounted on a wheel having upper and lower wheel flanges against which the upper and lower tire beads seal, respectively, the apparatus having an inflation head and an annular tire seal ring extending outwardly therefrom, the auxiliary tire bead depressor comprising:

a shaft for selectively depressing the upper tire bead away from the associated upper wheel flange, said shaft being located radially inward from the annular tire seal ring, and having an arcuate shaped tip which contacts the tire bead and a bore extending through said shaft having a first opening adjacent said arcuate shaped tip end and a second opening distant from said first opening in fluid communication with a source of pressurized air;

means for moving said shaft from an advanced position wherein said shaft engages and depresses the tire to a retracted position wherein said shaft is spaced from the tire; and means for mounting the auxiliary tire bead depressor to the inflation head;

wherein the annular tire seal ring extends a first distance from the inflation head and depresses the tire bead from the upper wheel flange, and said shaft extends a second distance from the inflation head, with said second distance being greater than said first distance.

10. A method for inflating a tubeless tire having sidewalls and upper and lower annular tire beads, the tire being mounted on a wheel having upper and lower wheel flanges against which the upper and lower tire beads seal, respectively, the method for use with an apparatus having an inflation head with an annular tire seal ring extending outwardly therefrom for depressing the sidewall, the inflation head having means for selectively supplying pressurized air to the tire, the apparatus further having an auxiliary tire bead depressor having means, spaced from the annular tire seal ring, for selectively depressing the upper tire bead away from the associated upper wheel flange, means for moving the tire bead depressing means from an advanced position wherein the depressing means engages and depresses the tire to a retracted position wherein the depressing means is spaced from the tire, and means for mounting the auxiliary tire bead depressor to the inflation head, the method comprising the steps of:

moving the inflation head to a fully advanced position, with the annular tire seal ring extending a first distance from the inflation head, wherein the tire seal ring depresses the tire sidewall;

moving the tire bead depressing means to the advanced position, with the tire bead depressing means extending a second distance from the inflation head, wherein the second distance is greater than the first distance;

turning on the air supply means;

allowing the pressurized air from the air supply means to inflate the tire to a predetermined inflation pressure;

turning off the air supply means;

raising the tire bead depressing means to the retracted position; and raising the inflation head to a retracted position.

11. The method as defined in claim 10 wherein before the inflation head and the tire bead depressing means are retracted fully, the method further comprises the steps of:

retracting the inflation head to an intermediate position while keeping the relative positions of the annular tire seal ring and the tire bead depressing means in a fixed relationship, such that the tire bead is in close proximity to, but spaced from the upper wheel flange; and holding this position for an amount of time sufficient to complete inflation of the tire to the predetermined inflation pressure.

12. The auxilliary tire bead depressor as defined in claim 9 further comprising a rectangularly shaped pad essentially opposed to said arcuately shaped tip.

* * * * *